(12) United States Patent
Takeda et al.

(10) Patent No.: US 7,636,218 B2
(45) Date of Patent: Dec. 22, 2009

(54) RECORDING METHOD, UNLOAD METHOD, AND MAGNETIC DISK

(75) Inventors: Sumie Takeda, Kanagawa (JP); Katsumoto Onoyama, Kanagawa (JP); Iwao Oshimi, Kanagawa (JP); Hiroyuki Oosawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 348 days.

(21) Appl. No.: 11/881,436

(22) Filed: Jul. 27, 2007

(65) Prior Publication Data
US 2008/0024897 A1  Jan. 31, 2008

(30) Foreign Application Priority Data
Jul. 27, 2006  (JP) ............... 2006-204664

(51) Int. Cl.
*G11B 15/04* (2006.01)
(52) U.S. Cl. ..................................... 360/60
(58) Field of Classification Search .......... 360/60, 360/48, 66, 31, 25, 55
See application file for complete search history.

(56) References Cited

U.S. PATENT DOCUMENTS

| 5,963,385 | A | 10/1999 | Takada et al. |
| 7,289,284 | B2 * | 10/2007 | Arai et al. ............... 360/25 |
| 7,372,653 | B2 * | 5/2008 | Suzuki et al. ............ 360/66 |
| 7,411,753 | B2 * | 8/2008 | Sakai ....................... 360/31 |
| 7,515,371 | B1 * | 4/2009 | Buch et al. ............... 360/66 |
| 2005/0243457 | A1 * | 11/2005 | Akamatsu et al. ....... 360/55 |
| 2007/0183072 | A1 * | 8/2007 | Lee .......................... 360/48 |

FOREIGN PATENT DOCUMENTS

| CN | 1691136 A | 11/2005 |
| JP | 2001-307408 | 11/2001 |
| JP | 2003-331402 | 11/2003 |

* cited by examiner

*Primary Examiner*—Fred Tzeng
(74) *Attorney, Agent, or Firm*—Townsend and Townsend and Crew LLP; Patrick Duncan

(57) ABSTRACT

Embodiments of the present invention prevent occurrence of a write pole erasure in the event of a power failure within a magnetic disk apparatus of a perpendicular magnetic recording system. According to one embodiment of the present invention, a recording current is flowed through a magnetic head to record data in a magnetic disk. An occurrence of a power failure in the magnetic disk apparatus is detected. When a power failure has occurred, the recording head is demagnetized with power in case of a power failure. The recording head is unloaded after the recording head has been demagnetized. For the power in case of a power failure, back electromotive force of a spindle motor can be utilized. As a result, effects exerted on data recorded in the magnetic disk due to residual magnetism remaining in the recording head can be eliminated.

20 Claims, 6 Drawing Sheets

RECORDING METHOD, UNLOAD METHOD, AND MAGNETIC DISK

CROSS-REFERENCE TO RELATED APPLICATION

The instant nonprovisional patent application claims priority to Japanese Patent Application No. 2006-204664 filed Jul. 27, 2006 and incorporated by reference in its entirety herein for all purposes.

BACKGROUND OF THE INVENTION

In a magnetic disk apparatus, a magnetic flux corresponding to a recording current is radiated from a magnetic pole of a magnetic head. The magnetic flux radiated from the recording head magnetizes the magnetic layer of a magnetic disk and forms micro magnets there, whereby information corresponding to the recording current is recorded. When subjected to a magnetic flux corresponding to a new recording current, the very small magnet that has been formed in the magnetic layer of the magnetic disk can change its direction of magnetization. Accordingly, the magnetic disk can be used as a rewritable recording medium.

The recording head is formed of a core constituting a magnetic path and a coil providing the core with a magnetomotive force. A portion of the core is opened to the air, forming a magnetic pole. The recording head, together with a reproduction head, is formed in a head/slider. The head/slider is attached to a head gimbals assembly (HGA) and adapted, when the magnetic disk apparatus performs recording or reproduction operation, to fly over the magnetic disk with a small space held from the surface of the magnetic disk. A magnetic flux corresponding to the recording current is adapted to flow through the recording head, and, when the recording current stops, residual magnetism, of a polarity depending on the direction of the last flow of the magnetic flux, will remain at the end of the magnetic pole opposing the disk surface.

Japanese Patent Publication No. 2003-331402 ("Patent document 1") discloses a technology to overcome a problem of the residual magnetism, due to a write current passed through the coil of the magnetic head, to cause a distortion of the played back waveform at the time of reproduction. Patent document 1 discloses a technology, in which a magnetic head is moved to a predetermined region of the magnetic disk, such as a CSS region or a gap area when a current is passed through a demagnetizing supply circuit, so that the effect of the recording current to degauss exerted on the recorded data in the magnetic disk may be eliminated.

Japanese Patent Publication No. 2001-307408 ("Patent document 2") discloses a technology, in which a back electromotive force produced by a spindle motor, continuing to rotate by inertia when the operating supply voltage to a magnetic disk apparatus is lowered, is supplied to a voice coil motor, so that an emergency retracting operation of the magnetic head is performed.

Patent document 1 discloses a technology that prevents occurrence of an error of distorted reproduction waveform when a magnetized signal in the magnetic disk is reproduced while residual magnetism is remains in a recording head. In a magnetic disk apparatus of an in-horizontal-plane magnetic recording system, the magnetic layer is magnetized in a horizontal direction by a leakage magnetic flux flowing through a gap between the upper and the lower magnetic poles of a ring type recording head, and therefore, in order to write information, it is required that a strong magnetic field is generated between the upper magnetic pole and the lower magnetic pole. Accordingly, it seldom occurs that the residual magnetism in the recording head exerts an effect on the information written in the magnetic layer.

On the other hand, in a magnetic disk apparatus of a perpendicular magnetic recording system, the magnetic disk has a magnetic layer and a soft magnetic layer with a high permeability lying thereunder. A write pole and a return pole constituting a monopole type recording head of the perpendicular magnetic recording system is arranged so as to have a larger write gap than the recording head in the in-horizontal-plane magnetic recording system; the magnetic flux radiated from the write pole or return pole passes perpendicularly to the magnetic layer so as to flow through the soft magnetic layer. Since the soft magnetic layer is made of a material having a high permeability, it has a low magnetic reluctance, and, hence, it is liable that a magnetic flux capable of magnetizing the magnetic layer is produced even if residual magnetism remaining in the write pole or the return pole is of a very small amount.

Accordingly, if the recording head of the perpendicular magnetic recording system having the residual magnetism remaining therein is moved over the magnetic disk, such problems arise that information already written in the magnetic disk is rewritten or deteriorated and, thereby, the disk becomes unable to reproduce. In such case, where the supply voltage has abruptly dropped while the magnetic disk apparatus was making recording operation, the retract motion of the head/slider is made before the recording head stops its rotation. If residual magnetism is remained in the recording head at this time, it affects the magnetic layer at the position corresponding to the trajectory of the recording head over the magnetic disk. When the supply voltage has dropped, a power source corresponding to an erasing power supply circuit cannot be obtained by the method as disclosed in Patent document 1.

Regarding the bit information recorded in the magnetic disk, if the number of error bits produced by the effect of residual magnetism in the recording head is small, the user may sometimes be unable to clearly notice the effect caused by residual magnetism, because the magnetic disk apparatus properly corrects the errors by the use of a error correcting code (ECC) or recovers the errors by execution of an error recovery procedure (ERP). However, decreasing the number of the error bits is an important problem in providing a high performance magnetic disk apparatus.

BRIEF SUMMARY OF THE INVENTION

Embodiments in accordance with the present invention prevent occurrence of write pole erasure in the event of a power failure within a magnetic disk apparatus of a perpendicular magnetic recording system. According to one embodiment of the present invention, a recording current is flowed through a magnetic head to record data in a magnetic disk. An occurrence of a power failure in the magnetic disk apparatus is detected. When a power failure has occurred, the recording head is demagnetized with power in case of a power failure. The recording head is unloaded after the recording head has been demagnetized. For the power in case of a power failure, back electromotive force of a spindle motor can be utilized. As a result, effects exerted on data recorded in the magnetic disk due to residual magnetism remaining in the recording head can be eliminated.

DETAILED DESCRIPTION OF THE INVENTION

Figure 1:
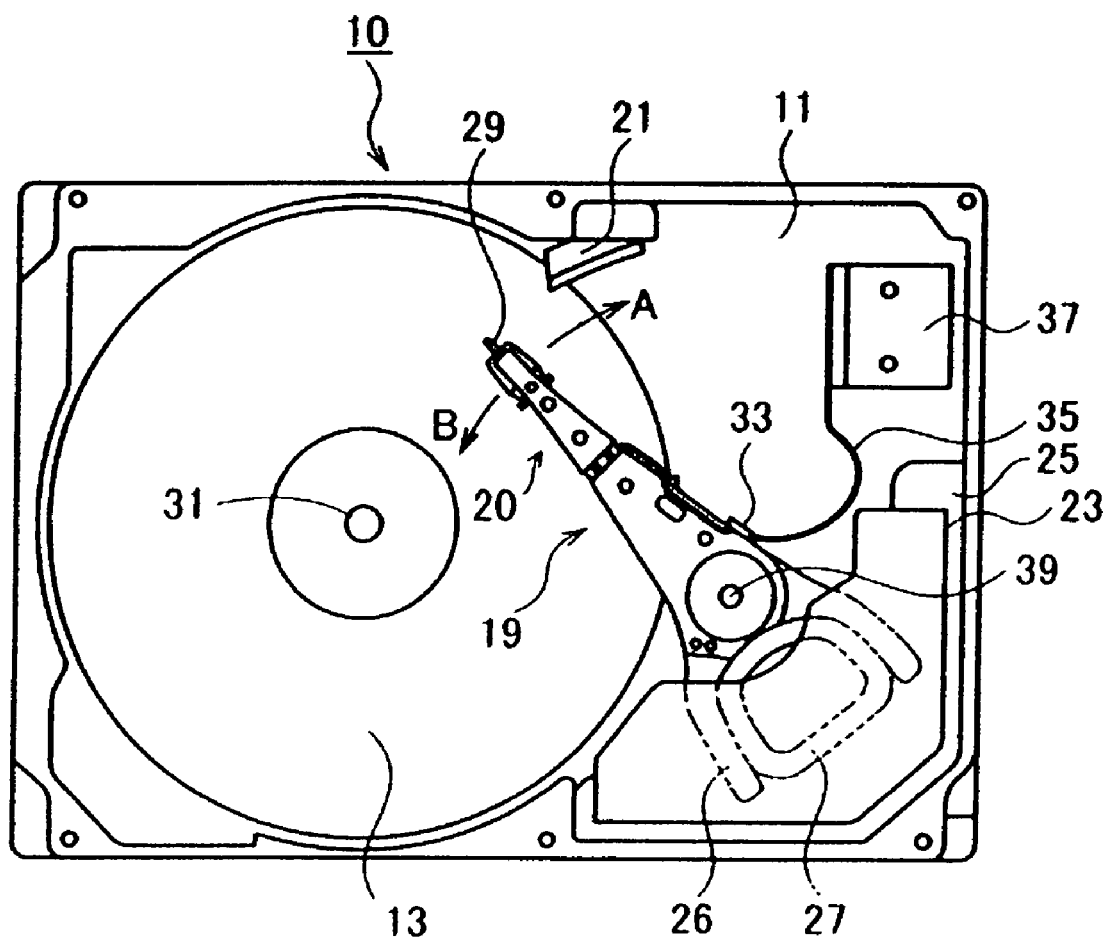
FIG. 1 is a plan view of a magnetic disk apparatus according to an embodiment of the present invention.

Embodiments in accordance with the present invention relate to a technology to reduce, while data is recorded in a magnetic disk of a perpendicular magnetic recording system, the effect of residual magnetism remaining in a recording head exerted on data recorded in the magnetic disk.

An object of embodiments of the present invention is to provide, in a magnetic disk apparatus of a perpendicular magnetic recording system, a recording method capable of reducing the effect exerted on recorded data in a magnetic disk caused by residual magnetism in the recording head produced when the supply voltage to the magnetic disk apparatus has dropped. Another object of embodiments of the present invention is to provide an unloading method capable, when the recording head is retracted outside the recording area of the magnetic disk upon dropping of the supply voltage to the magnetic disk apparatus, of reducing the effect of residual magnetism remaining in the recording head exerted on the data recorded in the magnetic disk. A further object of embodiments of the present invention is to provide a magnetic disk apparatus capable of perform the above enumerated recording methods.

Embodiments of the present invention provide a data recording method capable of positively eliminating a phenomenon of write pole erasure occurring particularly in a magnetic disk apparatus of a perpendicular magnetic recording system, even when a voltage dropping has been produced in the magnetic disk apparatus. When the supply voltage to the magnetic disk apparatus is dropped while a recording current is supplied to the recording head and data is being recorded in a magnetic disk, a recording current to degauss is supplied to the recording head before it is moved.

By the use of a back electromotive force of a spindle motor or electrical energy stored on a capacitor, the electrical power of the recording current to degauss can be secured even when the supply voltage has dropped. After the recording current to degauss has been passed through the recording head, data recorded in the magnetic disk is not affected by residual magnetism remaining in the recording head even if the recording head is moved over the magnetic disk. Although, in most cases, the recording head is moved at a power failure for the purpose for unloading the carriage with HGA, the movement of the recording head after the demagnetization according to embodiments of the present invention, is not limited to the purpose of unloading.

An AC current having a monotonously decreasing function as its envelope, can be used as the recording current to degauss. If an AC current is used, it is not necessary to take the polarity of the recording current to degauss into consideration and also the current value can be easily controlled. However, it is possible to use a DC current as well for demagnetization according to embodiments of the present invention. Further, the AC current for demagnetization may be a pulse current for use in recording data. Embodiments of the present invention can also be considered to be an unloading method of a magnetic disk apparatus employing the above described recording method and further to be a magnetic disk apparatus realizing the described recording method and unloading method.

Embodiments of the present invention provide a recording method, which, in a magnetic disk apparatus of a perpendicular magnetic recording system, is capable of reducing effects exerted on data recorded in a magnetic disk by residual magnetism caused by dropping of the supply voltage to the magnetic disk apparatus and remaining in the recording head. Further, embodiments of the present invention provide an unloading method, which makes it possible to reduce effects exerted on data recorded in a magnetic disk by residual magnetism in the recording head when the recording head is retracted to outside the recording area of the magnetic disk upon dropping of the supply voltage to the magnetic disk apparatus. Still further, embodiments of the present invention provide a magnetic disk apparatus capable of carrying out the above mentioned recording methods.

Overall Configuration of Magnetic Disk Apparatus

Figure 2:
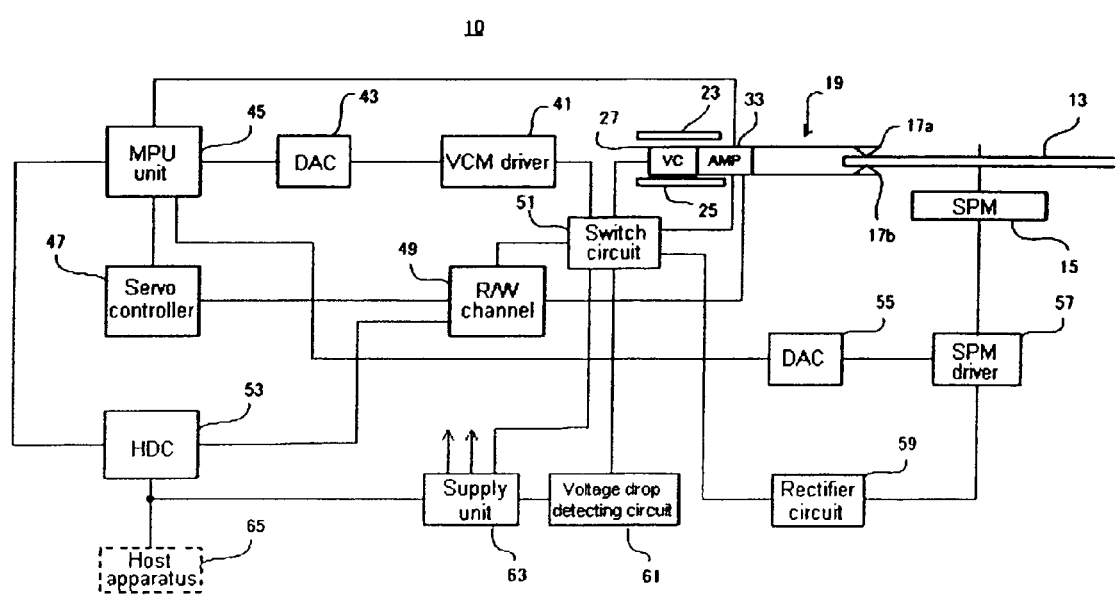
FIG. 2 is a schematic block diagram of a magnetic disk apparatus according to an embodiment of the present invention.

FIG. 1 is a plan view of a magnetic disk apparatus 10 according to an embodiment of the present invention, and FIG. 2 is a schematic block diagram of the magnetic disk apparatus 10. The magnetic disk apparatus 10 employs a perpendicular magnetic recording system and a load/unload system. To a base 11 are attached a magnetic disk 13, a carriage with HGA 19, a ramp mechanism 21, a voice coil magnet 23, a voice coil yoke 25, and the like. The ramp mechanism 21 is used for realizing the load/unload system. The use of the present invention is not limited to a magnetic disk apparatus of a load/unload system, but it can also be applied to a magnetic disk apparatus of a contact start/stop (CSS) system having a textured zone provided on the inner circumferential side or outer circumferential side of the magnetic disk.

The magnetic disk 13 is a perpendicular magnetic recording medium arranged to record data on both front and back sides thereof and is fixed to a hub of a spindle motor 15 (FIG. 2) disposed thereunder for rotation around a spindle shaft 31. On each of the front face and the back face of the magnetic disk 13 are laminated a perpendicular recording layer and a soft magnetic layer. The magnetic disk apparatus 10 employs a data face servo system and, there are written a plurality of servo data in a radial pattern onto the magnetic disk 13, along radiuses thereof. The magnetic heads 17a, 17b (FIG. 2) read the servo data and, thereby, the MPU unit 45 (FIG. 2) is enabled to recognize the positions of the magnetic heads 17a, 17b and control the positions of the magnetic heads. The configuration of the magnetic head will be explained in detail later with reference to FIG. 4.

The carriage with HGA 19 includes a head gimbals assembly (HGA) 20 at its front end side and a coil support 26 at its base end side. To the HGA 20 is attached a head/slider (not shown); to the coil support 26 is attached a voice coil 27. Under the voice coil magnet 23 is provided the voice coil yoke 25; between the voice coil magnet 23 and the voice coil yoke 25 is provided a magnetic flux space. The voice coil 27, voice coil magnet 23, and voice coil yoke 25 together constitute a voice coil motor (VCM) for driving the carriage with HGA 19.

By having a DC current passed through the voice coil 27 placed in the magnetic flux space, the carriage with HGA 19 is rotated around a pivot shaft 39 in the direction of the arrow A or the arrow B. The magnetic disk apparatus 10, when the carriage with HGA 19 rotates in the direction of the arrow A, allows a lift tab 29 formed at the tip of the HGA 20 to slide on the sliding face of the ramp mechanism 21 and, thereby, the carriage with HGA 19 stops at a home position. This motion is called "unload." The motion "unload" is performed when the rotation of the magnetic disk 13 is stopped upon arrival of an external command or upon occurrence of an internal event.

When the rotation of the magnetic disk 13 is stopped while the head/slider is flying over the magnetic disk 13, it sticks to the surface of the magnetic disk 13, to cause a phenomenon called "stiction" and, thereby, such a thing occurs that restarting of the spindle motor 15 becomes difficult or the magnetic disk 13 is damaged. Therefore, in the event of a power failure in the magnetic disk apparatus 10, the head/slider is unloaded so as to be retracted to the ramp mechanism 21 before the rotation of the magnetic disk 13 is stopped.

Reversely, the motion to cause the carriage with HGA 19 in the home position to move in the direction of the arrow B, away from the ramp mechanism 21, to fly over the rotating magnetic disk 13 is called "load." The motion "load" is performed before the magnetic head starts accessing the magnetic disk 13. Although the object to be loaded or unloaded herein is explained as "head", "head/slider", or "carriage with HGA" as appropriate, the motion is all the same even if the expression of the object is different.

The carriage with HGA 19 is attached to a head amplifier 33. The head amplifier 33 is connected with the magnetic heads 17a, 17b and a flexible cable 35. The flexible cable 35 is connected, through an external terminal 37, to a circuit board (not shown) mounted on the outer side of the base 11.

Overall Configuration of Magnetic Disk Apparatus

Referring to FIG. 2, the R/W channel 49 includes a write channel and a read channel and performs processing of a recording signal and a reproduction signal. The write channel modulates write-related digital data transferred from a host apparatus 65 through a hard disk controller (HDC) 53 and transfers the modulated data to the head amplifier 33. The read channel demodulates a reproduction signal received from the head amplifier 33 and outputs the demodulated signal to the host apparatus 65 through the HDC 53. Signals processed by the read channel 59 include servo information played back by the reproduction head from the magnetic disk 13. A servo controller 47 extracts servo information from the reproduction signal output from the R/W channel 49. The servo controller 47 transfers the extracted servo information to the MPU unit 45.

The HDC 53 has a function as an interface of the magnetic disk apparatus 10 and includes a buffer memory and its controller. The HDC 53 receives record data transferred from the host apparatus 65, adds ECC thereto, and transfers the data added with ECC to the R/W channel 49. The HDC 53 also performs error correction for reproduction data transferred from the R/W channel 49 and transfers the error corrected data to the host apparatus 65. Further, the HDC 53 receives command and control information from the host apparatus 65 to transfer the same to MPU unit 45. The HDC 53 generates an R/W gate signal corresponding to the operating mode of the magnetic disk apparatus 10 and sends the same to the R/W channel 49. A digital/analog converter (DAC) 43 converts a digital signal for controlling the carriage with HGA 19 output from the MPU unit 45 into an analog voltage and outputs the same to a VCM driver 41. The VCM driver 41 converts the analog voltage received from the DAC 43 into a driving current for a voice coil 27 and supplies the same to the voice coil 27 through a switch circuit 51.

The MPU unit 45 controls data communications between the host apparatus 65 and the same, operations of the carriage with HGA 19, data recording and playing back operations on the magnetic disk 13, and the like. The MPU unit 45 determines the position of the magnetic heads 17a, 17b based on servo information transferred from the servo controller 47 and calculates an input value to the DAC for speed controlling the carriage with HGA 19 based on the deviation between the present position and the target position of the magnetic head and outputs the calculated value to the DAC 43. The input value to the DAC is output from the MPU unit 45 each time the servo data is read out by the magnetic heads 17a, 17b.

The MPU unit 45 sends a digital signal for controlling the speed of the spindle motor to be maintained constant to a DAC 55 and the DAC 55 converts the signal into an analog voltage and sends the same to a spindle motor (SPM) driver 57. The SPM driver 57 converts the voltage received from the DAC 55 into a driving voltage for the spindle motor 15 and supplies the same to the spindle motor 15. A supply unit 63, receiving normal electric power from the host apparatus, converts the supplied voltage into predetermined voltages for use in various components of the magnetic disk apparatus 10 and supplies the voltage to each component. Although, in FIG. 2, the output of the supply unit 63 is shown as connected only to the switch circuit 51, in reality it is also connected to other components requiring power.

Figure 3:
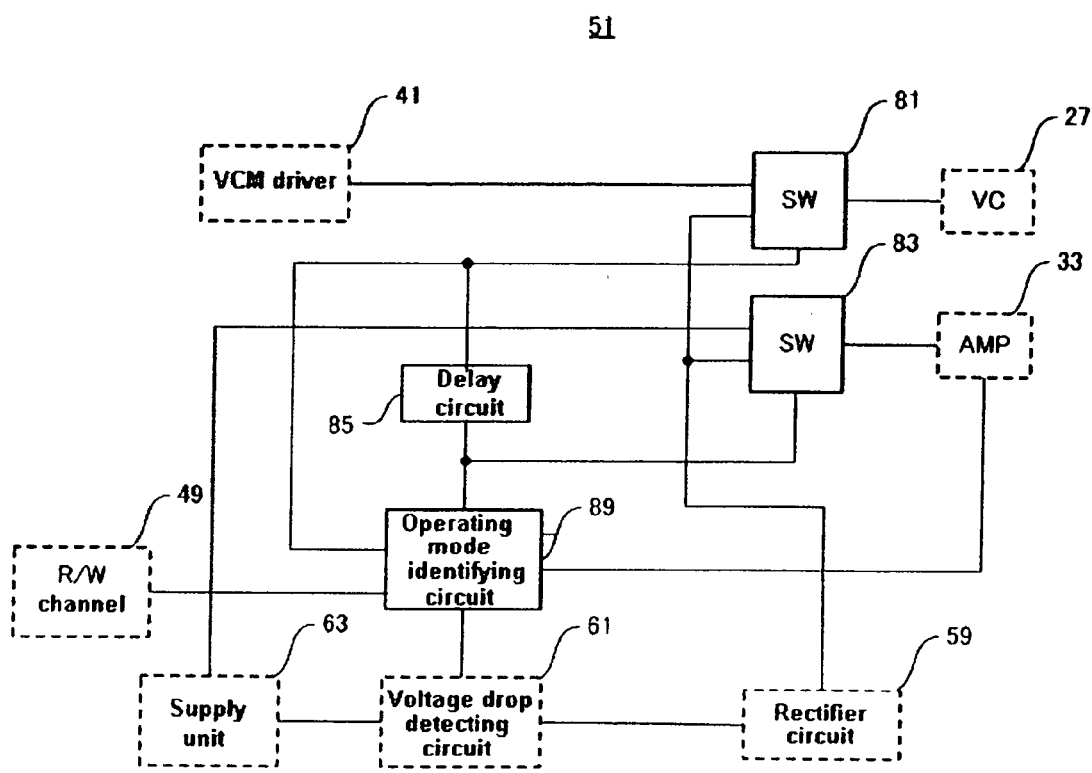
FIG. 3 is a schematic block diagram of a switch circuit.

A voltage drop detecting circuit 61 outputs a power failure signal to the switch circuit 51 when the voltage generated by the supply unit 63 has dropped. Here, the voltage drop means a drop to such a point where the magnetic disk apparatus 10 becomes unable to operate normally, including the case where the voltage has dropped to zero to thereby cause a power interruption. A rectifier circuit 59 generates power in case of a power failure when the supply unit 63 has become unable to obtain normal power. The rectifier circuit 59 is connected with the terminal of the SPM driver 57 and converts an AC voltage generated at the terminal of the spindle motor 15 into a DC voltage to supply the same to the switch circuit 51. While power is supplied to the spindle motor 15 from the supply unit 63 through the DAC 55, the voltage supplied to the spindle motor as it is supplied to the primary side of the rectifier circuit 59. However, from an instant when the supply unit 63 has failed, a back electromotive force generated in the coil of the spindle motor 15 is supplied thereto while the spindle motor 15 continues its rotation by inertia, FIG. 3 shows a block diagram of the switch circuit 51. The switch circuit 51 includes switches 81, 83, a delay circuit 85, and an operating mode identifying circuit 89. Since operating voltages of the switches 81, 83, delay circuit 85, and operating mode identifying circuit 89 are supplied from the rectifier circuit 59, the switch circuit 51 can be operated, when a power failure occurs, by the power supplied from the spindle motor 15. The operating mode identifying circuit 89 receives an R/W gate signal from the R/W channel 49 and identifies the operating mode only at the instant when the voltage drop detecting circuit 61 has output a power failure signal. The operating mode identifying circuit 89, when it identifies that the operating mode is a record mode, sends a switch signal to the switch 83, delay circuit 85, and head amplifier 33. The operating mode identifying circuit 89, when it identifies that the operating mode is an idle mode or reproduction mode, sends the switch signal only to the switch 81.

The delay circuit 85 generates a delay switch signal by delaying the switch signal received from the operating mode identifying circuit 89 for a time corresponding to the demagnetizing period and sends it to the switch 81. The switch 81 is adapted to switch an input thereto according to the delay switch signal output from the delay circuit 85 or the switch signal output from the operating mode identifying circuit 89. When the delay switch signal is not output from the delay circuit 85 or when the switch signal is not output from the operating mode identifying circuit 89, the switch 81 operates so that the VCM driver 41 is connected to the voice coil 27.

The switch 81 operates, when the delay switch signal is output from the delay circuit 85 or when the switch signal is output from the operating mode identifying circuit 89, so that the output from the rectifier circuit 59 is connected to the voice coil 27. The switch 83 operates, when the switch signal is not output from the operating mode identifying circuit 89, so that the supply unit 63 is connected to the head amplifier 33, and when the switch signal is output, so that the output of the rectifier circuit 59 is connected to the head amplifier 33.

Configuration of Magnetic Head

Figure 4:
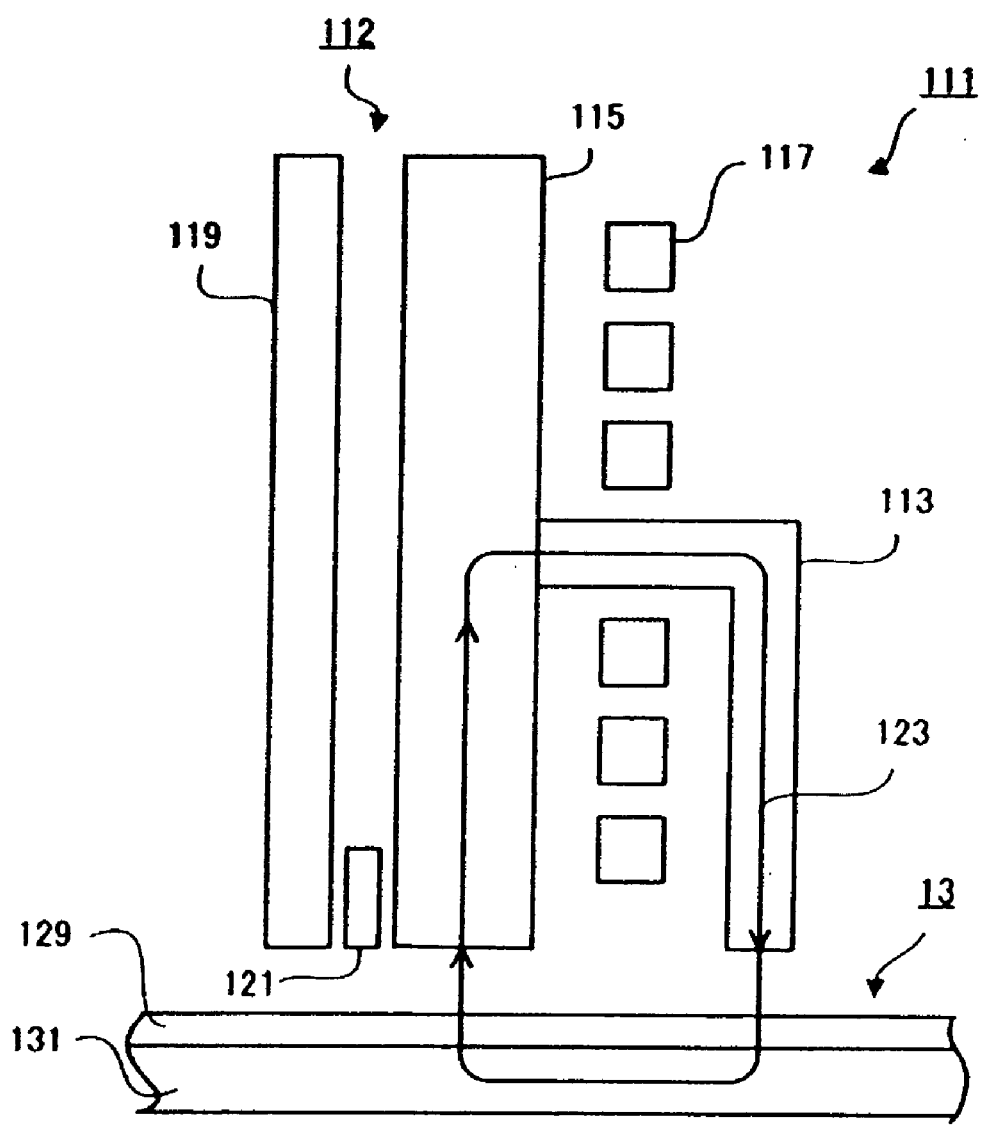
FIG. 4 is a schematic sectional view of a magnetic head.

FIG. 4 is a sectional view schematically showing the magnetic disk and the magnetic head. The magnetic heads 17a, 17b are formed into separate head/slider and the head/slider are each supported at the tip of the HGA 20 corresponding to the front and back sides of the magnetic disk 13. The magnetic heads 17a, 17b are of the same configuration and each thereof is formed into a compound type head with the recording head 111 and reproduction head 112 separated from each other. The recording head 111 is formed of a main pole (write pole) 113, made of a magnetic thin film having a high permeability, an auxiliary pole (return pole) 115, and a thin film coil 117. The auxiliary pole 115 has its section opposing the surface of the magnetic disk 13 made larger than that of the main pole 113.

The reproduction head 112 is configured of an upper shield 115, serving also as the auxiliary pole 115, a lower shield 119, and a GMR reproduction element 121 interposed therebetween. The magnetic disk 13 for perpendicular magnetic recording is configured by laminating a soft magnetic layer 131 with a high permeability and a perpendicular recording layer 129 made of CoCrPt or the like over a substrate (not shown) made of glass, aluminum, or the like, with a protective layer and a lubricant layer (both are not shown) applied over the perpendicular recording layer 129. When a recording current is supplied from the head amplifier 33 to the thin film coil 117 of the recording head 111, a magnetic flux 123 flows through a magnetic path formed of the main pole 113, auxiliary pole 115, perpendicular recording layer 129, and soft magnetic layer 131. The magnetic flux 123 passes the perpendicular recording layer 129 perpendicularly to the surface of the magnetic disk 13 and magnetizes the same and thus information is recorded.

The gap distance between the main pole 113 and the auxiliary pole 115 of the recording head 111 is made larger than that of a ring-shaped recording head for in-horizontal-plane magnetic recording and most of the magnetic flux flowing between the main pole 113 and auxiliary pole 115 passes through the soft magnetic layer 131. The magnetic head of the described configuration is called a monopole type recording head. A current flowing in different directions according to bit information to be recorded in the magnetic disk 13 flows through the thin film coil 117. When the recording is ended, the main pole 113 and the auxiliary pole 115 are magnetized so as to have the polarity determined by the direction of the magnetic flux 123 corresponding to the direction of the final recording current and, thereby, residual magnetism is generated at the tip. The main pole 113 having a smaller area has a larger effect of the residual magnetism to be exerted on the information recorded in the perpendicular recording layer. By the movement of the head/slider over the magnetic disk 13 while the main pole 113 has the residual magnetism, the magnetized condition in the perpendicular recording layer 129 is affected, so that bit reversal or bit erasure occurs. This phenomenon is called "write pall erasure."

Since the auxiliary pole 115 has a larger area, residual magnetism caused by magnetization due to the magnetic flux generated from very small magnets constituting information in the magnetic disk is stronger than residual magnetism caused by magnetization due to the magnetic flux from the recording current. The phenomenon in which the auxiliary pole 115 affects the magnetized condition in the perpendicular recording layer 129 to thereby cause bit reversal or bit erasure is called "return pole erasure."

Configuration of Head Amplifier

Figure 5A:
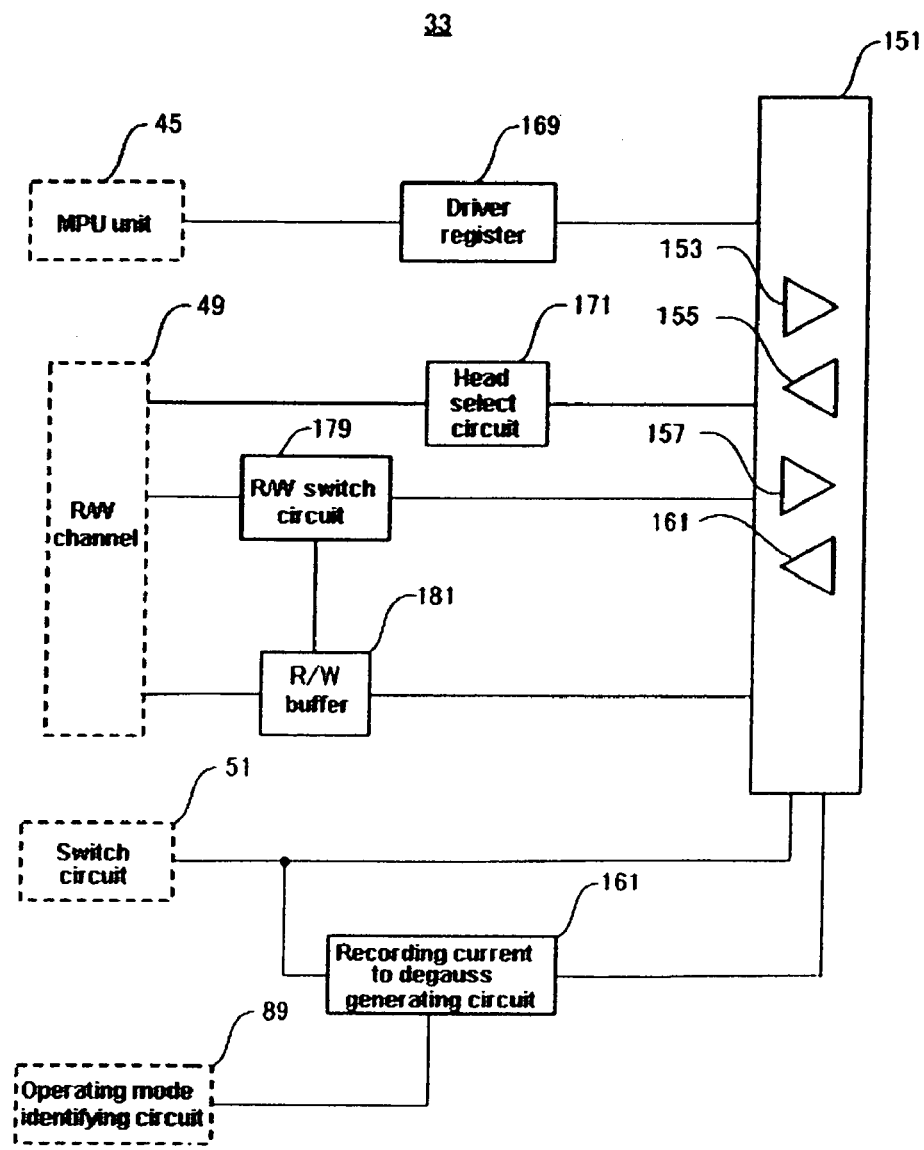
FIG. 5(A) is a schematic block diagram of a head amplifier and FIG. 5(B) is a chart showing a waveform of a demagnetizing current recording current to degauss.

FIG. 5 is a block diagram schematically showing the configuration of the head amplifier 33. The head amplifier 33 is attached to the carriage with HGA 19 as shown in FIG. 1. The head amplifier 33 includes a read/write driver (R/W driver) 151, driver register 169, head select circuit 171, read/write switch circuit (R/W switch circuit) 179, read/write buffer (R/W buffer) 181, and recording current to degauss generating circuit 161.

The head amplifier 33 converts a write signal received from the R/W channel 49 into a recording current and supplies the same to the recording head and, further, amplifies a reproduction signal detected by the reproduction head and sends the signal to the R/W channel 49. The R/W driver 151 includes a write driver 153 connected to the recording head 111 of the magnetic head 17a and a read amplifier 155 connected to the reproduction head 112. The R/W driver 151 further includes a write driver 157 connected to the recording head 111 of the magnetic head 17b and a read amplifier 161 connected to the reproduction head 112.

The write drivers 153, 157, when the magnetic disk apparatus 10 is in its recording mode and the voltage drop detecting circuit 61 has not output a power failure signal, convert a recording signal received from the read/write buffer (R/W buffer) 181 into a recording current and supplies the current to the thin film coil 117 of the recording head 111. The R/W driver 151, when the magnetic disk apparatus 10 is in its recording mode and the voltage drop detecting circuit 61 has output a power failure signal, detects the output of the recording current to degauss generating circuit 161 and supplies a recording current to degauss to the thin film coil 117 of the recording head.

The read amplifiers 155, 161, when the magnetic disk 13 is in its reproduction mode and the voltage drop detecting circuit 61 has not output a power failure signal, supplies a bias current to the reproduction head 112 and extracts a change in the electrical resistance of the GMR reproduction element caused by magnetic flux emitted from very small magnets formed as information in the magnetic disk 13 as a voltage change.

The recording current supplied from the R/W driver 151 to the recording head is controlled, by setting values in the driver register 169, so as to be varied in accordance with the specific characteristic of the recording head or the operational ambient temperature of the magnetic disk apparatus 10. The setting of the control data in the driver register 169 is performed by reference to a table of parameter values obtained by the MPU unit 45 in a test process. The R/W switch circuit 179 receives, through the R/W channel, an R/W gate signal corresponding to either of the recording operation mode and the reproduction operation mode generated by the HDC 53 and it, accordingly, switches the operating mode of the R/W driver 151 and the R/W buffer 181.

The R/W buffer 181, while transferring user data related to recording or reproduction with the R/W channel 49, temporarily records the user data. The head select circuit 171 receives the head select signal generated by the HDC 53 through the R/W channel 49 and renders either one of the magnetic heads 17a, 17b active. The recording current to degauss generating circuit 161 is supplied power from the rectifier circuit 59 and, even when normal power fails, it can be operated by power in case of power failure. The recording current to degauss generating circuit 161, in response to the switch signal received from the operating mode identifying circuit 89, outputs the recording current to degauss only for a demagnetization period.

Figure 5B:
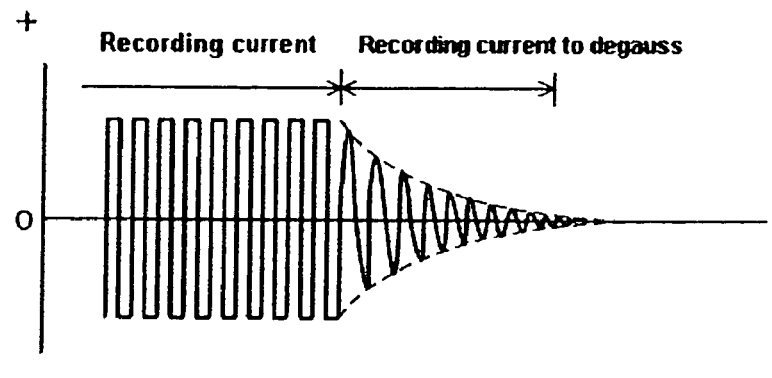
Figure 6:
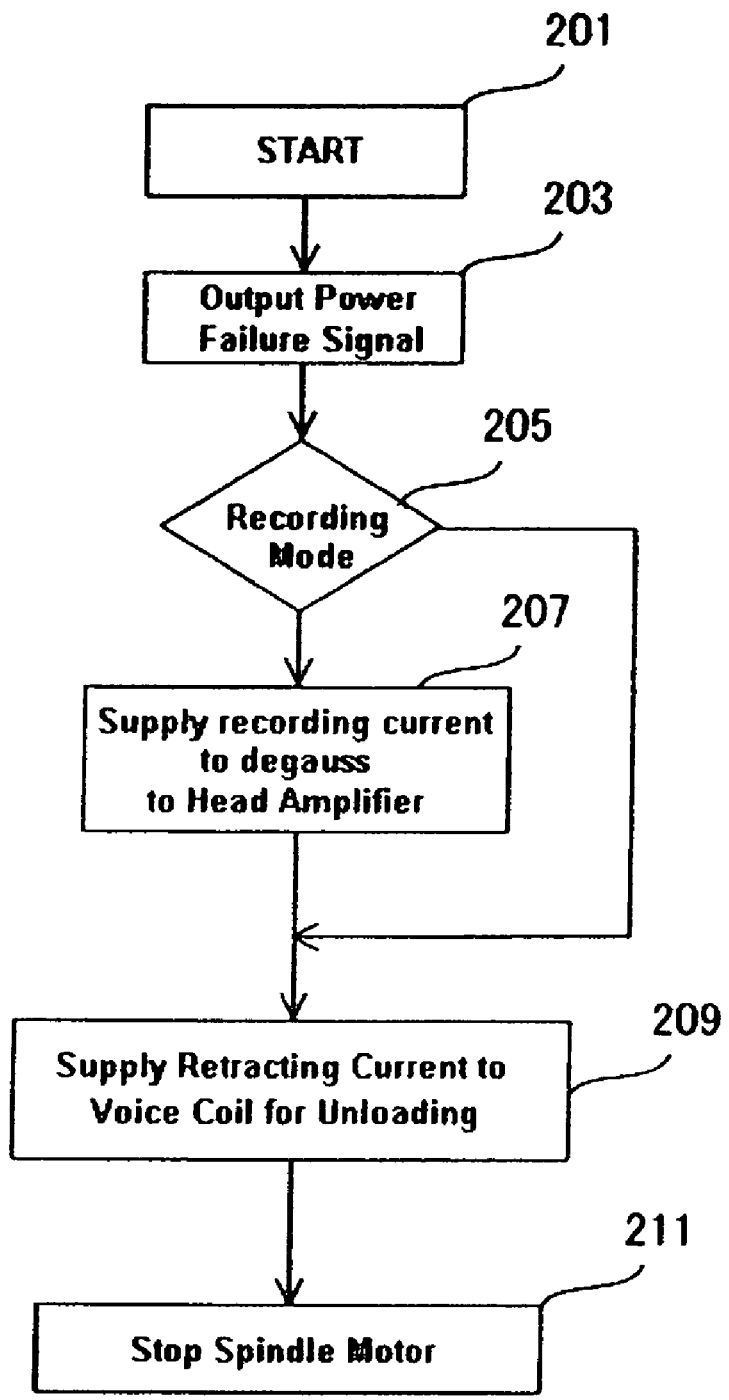
FIG. 6 is a flowchart showing procedural steps of an unloading method according to an embodiment of the present invention.

FIG. 5(B) is a chart showing the waveform of a current flowing from the R/W driver 151 to the recording head. While the recording current is a DC current having either of the polarities corresponding to bit signals, the recording current to degauss is an AC current having a monotonously decreasing function, such as an exponential function whose base is the Napier's number, as its envelope. Although, the frequency of the recording current to degauss is around 50 MHz-300 MHz and the demagnetizing time is set as a value selected from a range of 50 nanoseconds-100 nanoseconds in the present embodiment, the frequency and demagnetizing time in the present invention are not limited within these boundaries.

The block diagrams shown in FIGS. 2, 3, and 5 are examples of the magnetic disk apparatus according to the embodiments of the present invention. Those skilled in the art may, based on known art, will be able to realize other modes of embodiments by combining or splitting the functions shown in these drawings, but such embodiments are also included within the scope of the present invention.

Procedural Steps of Unloading

The procedural steps taken in unloading the carriage with HGA 19 when the supply voltage to the magnetic disk apparatus 10 drops will be described below. In Block 201, the head/slider is loaded over the magnetic disk 13 and the magnetic disk apparatus 10 is operating in one of the recording mode, reproduction mode, or idle mode. In the idle mode, the MPU unit 45 is controlling the carriage with HGA 19 only by processing the servo information. The supply unit 63 converts normal power supplied from the host apparatus 65 into predetermined voltages and supplies the voltages to respective components of the magnetic disk apparatus 10.

In the recording mode, the R/W switch circuit 179 of the head amplifier 33 receives a write gate signal from the R/W channel 49 and allows the R/W buffer 181 and the R/W driver 151 to operate in the recording mode. Since a power failure signal is not output from the voltage drop detecting circuit 61, the switch 83 of the switch circuit 51 operates so that voltage is supplied to the R/W driver 151 of the head amplifier 33 from the supply unit 63. In the R/W driver 151, either the write driver 153 or the write driver 157 selected by the head select circuit 171 is rendered active.

In Block 203, on account of occurrence of a power failure in the host apparatus 65, occurrence of a trouble in the supply unit 63, or the like, the voltage drop detecting circuit 61 outputs a power failure signal to the operating mode identifying circuit 89. If the magnetic disk apparatus 10 was operating in the recording mode when the power failure signal was output, then the output voltage of the supply unit 63 would drop and the R/W driver 151 would stop generation of the recording current. As a result, the main pole 113 of the recording head 111 would be magnetized by the magnetic flux 123, in the direction in which the flux was flowing at the instant when the recording current was cut off, and thus residual magnetism would remain on the surface opposing the magnetic disk 13.

In Block 205, the operating mode identifying circuit 89 in receipt of the power failure signal identifies the present operating mode based on the R/W gate signal received from the R/W channel 49. When the operating mode is the recording mode, the operating mode identifying circuit 89 sends a switch signal to the switch 83, delay circuit 85, and head amplifier 33. The switch 83 in receipt of the switch signal operates such that the output voltage of the rectifier circuit is supplied to the head amplifier 33. In the head amplifier 33, the recording current to degauss generating circuit 161 generates a recording current to degauss as shown in FIG. 5(B) and supplies the current to the thin film coil 117 of the recording head 111, in which the residual magnetism has been produced, for a predetermined period of time selected from between 50 nanoseconds-100 nanoseconds through the R/W driver 151 (Block 207).

In Block 209, the delay circuit 85 in receipt of the switch signal starts counting the demagnetizing time and, after counting it up, sends a delay switch signal to the switch 81. Upon receipt of the delay switch signal, the switch 81 operates so that the DC voltage supplied from the rectifier circuit 59 is supplied to the voice coil 27. The polarity of the DC voltage is preset in such a direction as to unload the carriage with HGA 19. The carriage with HGA 19, driven by the driving force of the VCM, moves in the unloading direction and the lift tab 29 slides on the ramp mechanism 21, so that the carriage with HGA 19 stops at the home position. The spindle motor stops spontaneously at Block 211.

Although the recording head 111 moves over the magnetic disk 13 during the unloading, it does not affect the states of the very small magnets recorded as information in the magnetic disk 13 because the main pole 113 has been demagnetized before the unloading is started. It is possible to use a DC current for the recording current to degauss. In such a case, it becomes necessary to identify the polarity when a power failure has occurred and passes a DC current with straight polarity and suitable magnitude. In contrast, an AC recording current to degauss having a monotonously decreasing function as its envelope can be easily generated. When the operating mode identifying circuit 89 determines that the operating mode is not the recording mode in Block 205, it sends the switch signal only to the switch 81. Upon receipt of the switch signal, the switch 81 operates such that the output of the rectifier circuit 59 is connected to the voice coil 27 and the carriage with HGA 19 is immediately unloaded without waiting for a demagnetizing operation.

According to the present embodiment, when the carriage with HGA 19 is urgently unloaded in the event of a power failure of the magnetic disk apparatus 10, a recording current to degauss can be secured and the demagnetization can be positively performed. Immediately after occurrence of the power failure, the back electromotive force of the spindle motor is utilized for the recording current to degauss of the recording head and, after the demagnetizing time has passed, it can be utilized for a retracting current to unload the carriage with HGA 19. When the moment of inertia of the rotating system constructed of the spindle motor 15 and the magnetic disk 13 is insufficient for supplying power for the demagnetization and unloading, a capacitor may be provided as a power supply to be concomitantly used therefor. Further, since the power required for demagnetization is smaller than the power required for unloading, the power for use as the recording current to degauss only may be supplied from energy stored in a capacitor. Furthermore, all the power for demagnetization and unloading may be supplied from energy stored in a capacitor.

Although the present invention has been described so far in accordance with embodiments shown in drawings, the invention is not limited to the embodiments shown in the drawings. As a matter of course, any known configurations may be used as long as the functions of the present invention are executed thereby.

What is claimed is:

1. A method, in a magnetic disk apparatus of a perpendicular magnetic recording system, for recording data comprising the steps of:
    recording data in a magnetic disk by flowing a recording current through a recording head;
    flowing a recording current to degauss through said recording head when supply voltage to said magnetic disk apparatus drops during said recording step; and
    moving said recording head subsequent to said step of flowing said recording current to degauss.
2. The method for recording according to claim 1, wherein said step of flowing a recording current to degauss includes a step of generating a recording current to degauss from a back electromotive force of a spindle motor.
3. The method for recording according to claim 1, wherein said step of flowing a recording current to degauss includes a step of generating a recording current to degauss from electrical energy stored in a capacitor.
4. The method for recording according to claim 1, wherein said step of moving said recording head includes a step of unloading a carriage with head gimbals assembly (HGA).
5. The method for recording according to claim 1, wherein said recording current to degauss is an AC current having a monotonously decreasing function as its envelope.
6. The method for recording according to claim 1, wherein said recording current to degauss is a DC current.
7. A method for unloading a carriage with HGA in a magnetic disk apparatus of a perpendicular magnetic recording system comprising the steps of:
    loading a head/slider over a magnetic disk;
    identifying an operating mode when supply voltage to said magnetic disk apparatus drops while said head/slider is being loaded;
    flowing a recording current to degauss through a recording head when a recording mode is identified in said identifying step; and
    unloading said carriage with HGA subsequent to said recording current to degauss flowing step.
8. The method for unloading according to claim 7, further comprising a step of unloading said head/slider without flowing a recording current to degauss through said recording head when a reproduction mode is identified in said identifying step.
9. The method for unloading according to claim 7, wherein said step of unloading includes a step of supplying a voice coil of said carriage with HGA with power generated from a back electromotive force of a spindle motor.
10. The method for unloading according to claim 7, wherein said step of flowing a recording current to degauss includes a step of generating a recording current to degauss from a back electromotive force of a spindle motor or energy stored in a capacitor.
11. A magnetic disk apparatus of a perpendicular magnetic recording system comprising:
    a magnetic disk;
    a spindle motor for rotating said magnetic disk;
    a recording head for recording data in said magnetic disk;
    a carriage with HGA for positioning said recording head in a predetermined position over said magnetic disk;
    a recording current generating portion for supplying a recording current to said recording head;
    a voltage drop detecting portion for detecting a drop in power voltage supplied to said magnetic disk apparatus; and
    a demagnetizing portion for supplying said recording head with a recording current to degauss in response to an output from said voltage drop detecting portion.
12. A magnetic disk apparatus according to claim 11, wherein
    said demagnetizing portion includes a switch circuit for having power, which is supplied to a recording current to degauss generating circuit generating an AC recording current to degauss and said recording current to degauss generating circuit, switched between normal power and power in case of a power failure.
13. The magnetic disk apparatus according to claim 12, wherein
    said power in case of a power failure is generated from a back electromotive force of said spindle motor.
14. The magnetic disk apparatus according to claim 12, wherein
    said switch circuit includes an operating mode identifying portion for identifying an operating mode of said magnetic disk apparatus and said operating mode identifying portion allows, only when identifying that said magnetic disk apparatus is operating in a recording mode, said recording current to degauss generating circuit to output a recording current to degauss in response to an output from said voltage drop detecting portion.
15. The magnetic disk apparatus according to claim 12, wherein
    said recording current to degauss generating circuit is accommodated in a head amplifier attached to said carriage with HGA.
16. The magnetic disk apparatus according to claim 11, wherein
    said switch circuit supplies a retracting current generated from a back electromotive force of said spindle motor to a voice coil of said carriage with HGA after said recording current to degauss has been supplied for a demagnetizing time, to thereby unload said carriage with HGA.
17. The magnetic disk apparatus according to claim 11, wherein
    said magnetic disk apparatus employs a load/unload system by use of a ramp mechanism.
18. The magnetic disk apparatus according to claim 11, wherein
    said magnetic disk apparatus employs a contact start/stop system by having a retract region provided on said magnetic disk.

19. The magnetic disk apparatus according to claim 11, wherein said recording head is a monopole type recording head.

20. The magnetic disk apparatus according to claim 11, wherein said demagnetizing time is a predetermined time period within a range of 50 nanoseconds to 100 nanoseconds.

* * * * *